United States Patent
Govindan

(10) Patent No.: US 11,379,312 B2
(45) Date of Patent: Jul. 5, 2022

(54) MONITORING AND PROCESSING STORAGE RESOURCE DATA USING SMART TAGGING TECHNIQUES

(71) Applicant: EMC IP Holding Company LLC, Hopkinton, MA (US)

(72) Inventor: Balasundaram Govindan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 58 days.

(21) Appl. No.: 17/068,935

(22) Filed: Oct. 13, 2020

(65) Prior Publication Data
US 2022/0114057 A1 Apr. 14, 2022

(51) Int. Cl.
*G06F 12/00* (2006.01)
*G06F 11/14* (2006.01)
*G06F 3/06* (2006.01)

(52) U.S. Cl.
CPC ........ *G06F 11/1458* (2013.01); *G06F 3/0605* (2013.01); *G06F 3/0608* (2013.01); *G06F 3/0614* (2013.01); *G06F 3/0631* (2013.01); *G06F 3/0644* (2013.01); *G06F 3/0653* (2013.01); *G06F 3/0673* (2013.01); *G06F 11/1448* (2013.01); *G06F 2201/84* (2013.01)

(58) Field of Classification Search
CPC ............. G06F 11/1469; G06F 11/1451; G06F 12/0246; G06F 12/0292; G06F 12/0848; G06F 12/0873; G06F 12/10; G06F 13/1668; G06F 13/4068; G06F 3/0628; G06F 3/0637; G06F 9/5016; G06F 11/1448; G06F 11/1461
See application file for complete search history.

(56) References Cited

U.S. PATENT DOCUMENTS

| | | | |
|---|---|---|---|
| 10,698,919 B2 | 6/2020 | Talius et al. | |
| 10,754,729 B2 | 8/2020 | Mehta et al. | |
| 10,761,942 B2 | 9/2020 | Mehta et al. | |
| 2017/0031776 A1 | 2/2017 | Ren et al. | |
| 2017/0090796 A1* | 3/2017 | Mutha | G06F 3/0605 |
| 2018/0253239 A1* | 9/2018 | Mutha | G06F 3/065 |

* cited by examiner

*Primary Examiner* — John A Lane
(74) *Attorney, Agent, or Firm* — Ryan, Mason & Lewis, LLP

(57) ABSTRACT

Methods, apparatus, and processor-readable storage media for monitoring and processing storage resource data using smart tagging techniques are provided herein. An example computer-implemented method includes obtaining data pertaining to multiple storage resources in at least one storage system; generating one or more smart tags related to one or more storage parameters; applying at least one of the one or more smart tags to at least a portion of the data; monitoring at least the portion of the data with the one or more smart tags; generating, based at least in part on the monitoring, at least one alert pertaining to at least one of the multiple storage resources; and performing one or more automated actions based at least in part on the at least one alert.

20 Claims, 6 Drawing Sheets

MONITORING AND PROCESSING STORAGE RESOURCE DATA USING SMART TAGGING TECHNIQUES

FIELD

The field relates generally to information processing systems, and more particularly to storage in such systems.

BACKGROUND

Creating application-consistent copies of data is commonly required for various applications. Such copies are important, for example, to minimize the recovery point objective (RPO) in case of an issue. Additionally, in certain contexts such as, for example, situations involving critical applications or resources, multiple copies of data can be required to be generated on scheduled bases. However, conventional storage management approaches typically require manual generation of copy creation schedules, which can lead to errors and detrimental performance impacts.

Another issue with respect to conventional storage management approaches is monitoring the utilization of certain storage resources, and expanding such resources when capacity limits are neared. Such approaches typically include storage administrators being required to monitor each replication product to achieve the RPO and to manually examine utilization of the resources and expand them as necessary, which can produce increasing complexities and lead to errors as well as unnecessary latencies.

SUMMARY

Illustrative embodiments of the disclosure provide techniques for monitoring and processing storage resource data using smart tagging techniques. An exemplary computer-implemented method includes obtaining data pertaining to multiple storage resources in at least one storage system, generating one or more smart tags related to one or more storage parameters, and applying at least one of the one or more smart tags to at least a portion of the data. The method also includes monitoring at least the portion of the data with the one or more smart tags, generating, based at least in part on the monitoring, at least one alert pertaining to at least one of the multiple storage resources, and performing one or more automated actions based at least in part on the at least one alert.

Illustrative embodiments can provide significant advantages relative to conventional storage management approaches. For example, problems associated with error-prone manual generation of copy creation schedules and resource monitoring are overcome in one or more embodiments through generating and utilizing smart tags to perform automated actions with respect to storage resource alerts.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
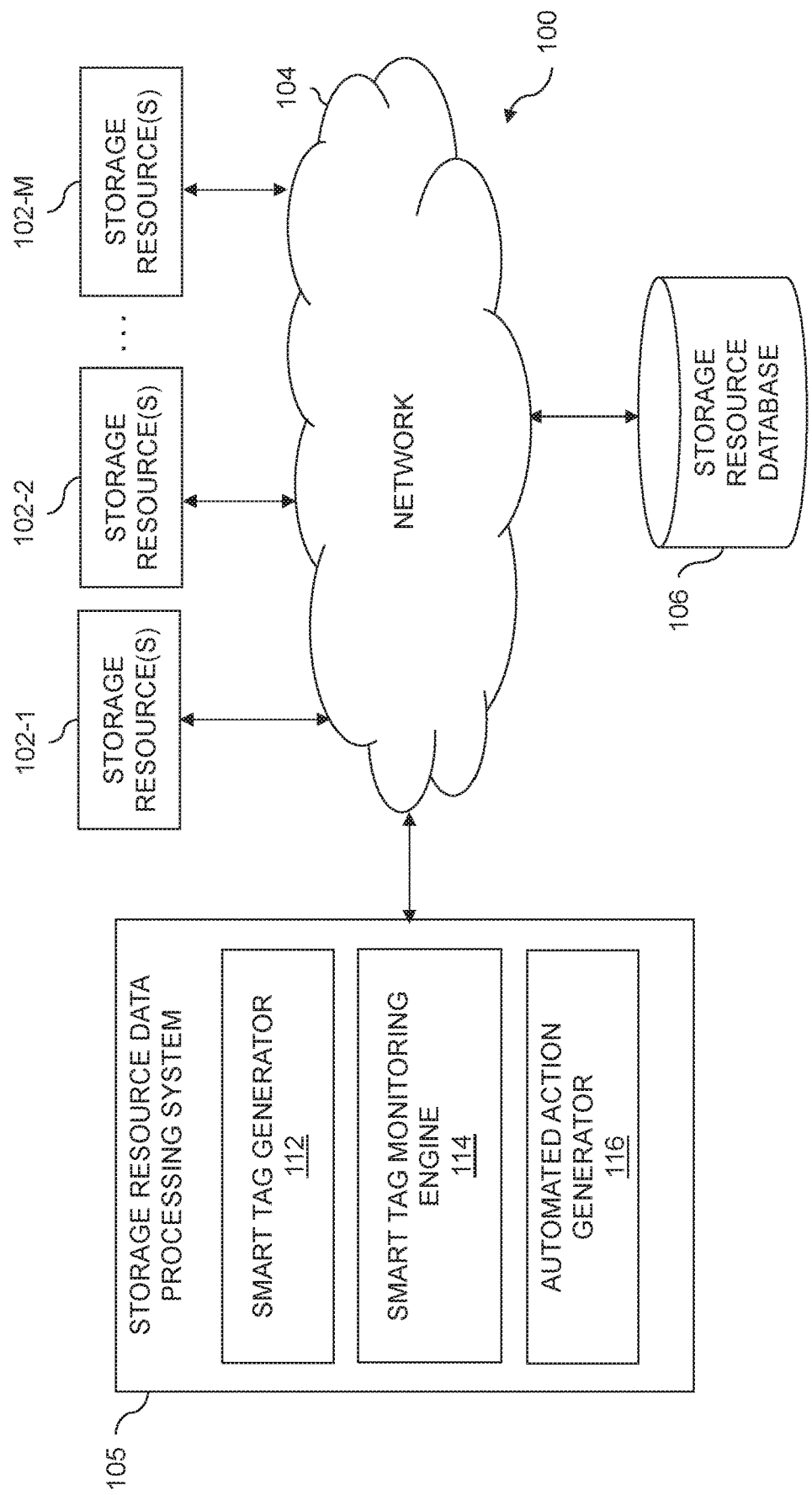
FIG. 1 shows an information processing system configured for monitoring and processing storage resource data using smart tagging techniques in an illustrative embodiment.

FIG. 1 shows a computer network (also referred to herein as an information processing system) 100 configured in accordance with an illustrative embodiment. The computer network 100 comprises a plurality of storage resources 102-1, 102-2, . . . 102-M, collectively referred to herein as storage resources 102. The storage resources 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage resource data processing system 105.

The storage resources 102 may comprise, for example, storage objects such as storage groups, volumes, logical unit numbers (LUNs), etc., and may also comprise software-defined storage stacks. As used herein, a software-defined storage stack refers to software that abstracts data storage resources from an underlying physical storage hardware. In one or more embodiments, storage resources 102 can be contained within and/or associated with devices such as mobile telephones, laptop computers, tablet computers, desktop computers or other types of computing devices. Such devices are examples of what are more generally referred to herein as "processing devices." Some of these processing devices are also generally referred to herein as "computers."

The storage resources 102 in some embodiments comprise respective resources associated with a particular storage system (e.g., one or more storage arrays), company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, storage resource data processing system 105 can have an associated database 106 configured to store data pertaining to storage resource data, which comprise, for example, RPO-related data, capacity-related data, etc.

The database 106 in the present embodiment is implemented using one or more storage systems associated with storage resource data processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with storage resource data processing system 105 can be one or more input-output devices, which illustratively comprise keyboards, displays or other types of input-output devices in any combination. Such input-output devices can be used, for example, to support one or more user interfaces to storage resource data processing system 105, as well as to support communication between storage resource data processing system 105 and other related systems and devices not explicitly shown.

Additionally, storage resource data processing system 105 in the example FIG. 1 embodiment is assumed to be implemented using at least one processing device. Each such processing device generally comprises at least one processor and an associated memory, and implements one or more functional modules for controlling certain features of storage resource data processing system 105.

More particularly, storage resource data processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

In one or more embodiments, the memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows storage resource data processing system 105 to communicate over the network 104 with the storage resources 102, and illustratively comprises one or more conventional transceivers.

The storage resource data processing system 105 further comprises a smart tag generator 112, a smart tag monitoring engine 114, and an automated action generator 116.

It is to be appreciated that this particular arrangement of modules 112, 114 and 116 illustrated in the storage resource data processing system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for monitoring and processing storage resource data using smart tagging techniques involving storage resources 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, storage resource data processing system 105 and storage resource database 106 can be on and/or part of the same processing platform.

An exemplary process utilizing modules 112, 114 and 116 of an example storage resource data processing system 105 in computer network 100 will be described in more detail with reference to the flow diagram of FIG. 4.

Accordingly, at least one embodiment includes smart tagging of storage resources for use in connection with monitoring and alerting tasks. By way of example, such an embodiment includes introducing, in connection with at least one storage system (e.g., a storage array), one or more smart tag prefixes to generate notifications in instances when a data copy is missing and/or to generate at least one RPO value and alert in instances wherein data reach at least one value specified by a storage administrator. As used herein, a storage administrator can refer to a human actor who manages enterprise arrays in a data center and safeguards the storage and retrieval of data for an enterprise or other organization. Example smart tag prefixes can include "RPO" and "SpaceAlert," as further detailed herein, and in one or more embodiments, such tag prefixes are static and pre-defined in the given storage array for storage administrator configuration.

In connection with an "RPO" smart tag prefix, a storage administrator can tag given resources (such as, for example, storage groups, volumes, etc.) having an RPO value with the tag. For instance, such tags, in one or more example embodiments, might appear as "RPO:30 minutes," "RPO:1 hour," or "RPO:24 hours." In such an embodiment, an enterprise array interprets the value associated with the tag and compares the value to that of the last created copy of the data. Also, as used herein, an enterprise array refers to a storage array with smartness enabled. Additionally, a storage array is typically a group of hard disks used to store data, while an enterprise array can include one or more hard disks along with capabilities and/or functions such as compression, snapshots, security, encryption, disaster recovery mechanism, mail generation, management user interface, etc. included and/or incorporated as well. Further, at least one embodiment includes adding and/or incorporating features such as a tag manager, a tag monitor engine, and an automated event generator into an enterprise array. An enterprise array user interface can, for example, also include one or more management screens, one or more alert screens, and one or more event screens. Such an embodiment includes ensuring that the storage objects tagged with the "RPO" tag prefix have a copy of the relevant data for the specified RPO. In a scenario wherein an RPO is missed, such an embodiment includes generating and/or outputting an alert to the storage administrator.

Additionally or alternatively, in at least one embodiment, a storage array can include implementing an internal monitor thread to check an RPO value and compare the RPO value with that of the last copy of the resource in question. Such an embodiment can also include alerting the storage administrator in an instance wherein there is no copy of the data for the RPO. In such a scenario, the storage administrator can create at least one snapshot to satisfy the RPO and/or can automate the snapshot creation in response to an alert. Accordingly, in one or more embodiments, the smart tagging (e.g., via the "RPO" tag prefix) facilitates monitoring of the snapshots of given resources. As used herein, a snapshot refers to a space-efficient pointer-based copy of data from at least one storage device. A snapshot denotes the state of a storage device at a particular time, which helps to restore the storage device at and/or to a specific point in time. Additionally, a snapshot shares data blocks with at least one actual volume once created, and both the data volume(s) and the snapshot can point to the same block(s) in an array. Any changes in the data volume after snapshot creation would be copied to at least one new block in the array, and the data volume point change would be copied to at least one new block. Notwithstanding, the snapshot would continue to point to the same data as when the snapshot was created.

In connection with a "SpaceAlert" smart tag prefix, a storage administrator can tag given resources (such as, for example, storage groups, volumes, etc.) having space (also referred to herein as capacity) values with the tag to enable automatic generation of alerts when such values reach one or more predetermined levels. For instance, such tags, in one or more example embodiments, might appear as "SpaceAlert: 70," "SpaceAlert:80," or "SpaceAlert:90." In such an embodiment, an enterprise array interprets the value and compares the allocated capacity to the configured value. In a scenario wherein a given resource reaches a capacity value such as 70%, 80% or 90% (and such values meet or exceed the tag-associated value), at least one embodiment can include triggering the generation and/or output of an alert to at least one storage administrator. Such an embodiment includes ensuring that the resources (e.g., storage objects) are expanded at an appropriate time to limit and/or avoid performance impact(s).

Additionally or alternatively, in at least one embodiment, a storage array can include implementing an internal monitor thread to check resource capacity values and send alerts to the storage administrator(s). Based at least in part on the alert(s), a storage administrator can perform one or more appropriate actions (e.g., expanding a volume) and/or can automate one or more actions (e.g., expanding a volume) in response to an alert. Accordingly, in one or more embodiments, the smart tagging (e.g., via the "SpaceAlert" tag prefix) facilitates monitoring resource utilization and automated alerting in conjunction with such monitoring.

As detailed herein, in at least one embodiment, a smart tag scheduler can be implemented and/or run in at least one storage array to monitor one or more smart tags applied to one or more storage resources in the array. Based at least in part on the monitoring, such an embodiment can include identifying one or more potential issues in at least a portion of the one or more storage resources, and generating and/or outputting at least one alert or notification (e.g., to a storage administrator) based on the real-time state of the resource(s). Additionally or alternatively, one or more embodiments can include performing at least one automated action (e.g., automatically creating a snapshot, expanding a storage object's capacity, etc.) in connection with and/or in response to an alert.

As noted herein, one or more embodiments are illustrated via use of "RPO" and "SpaceAlert" smart tag examples, but it is to be appreciated that additional and/or alternate embodiments can include the use of different and/or additional smart tags based, for example, on one or more storage administrator requirements.

By way of illustration, one or more example use cases are detailed in connection with the FIG. 2 and FIG. 3 workflows.

Figure 2:
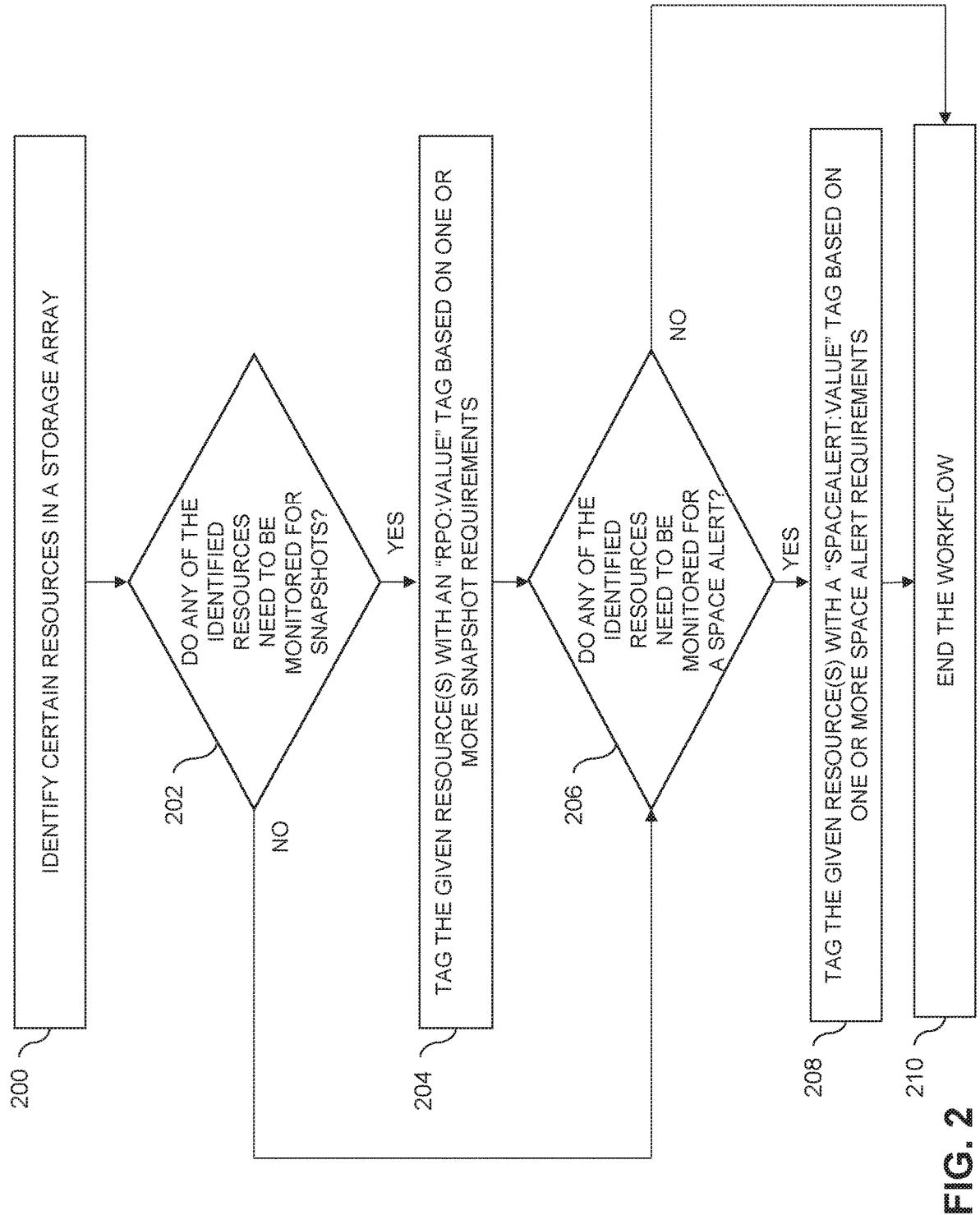
FIG. 2 shows an example workflow of actions carried out by at least one storage administrator in an illustrative embodiment.

FIG. 2 shows an example workflow of actions carried out by at least one storage administrator in an illustrative embodiment. Step 200 includes identifying certain (e.g., critical and/or important) resources in at least one storage array, and step 202 includes determining whether any of the identified resources need to be monitored for snapshots. If yes (that is, at least one of the identified resources needs to be monitored for snapshots), step 204 includes tagging the given resource with an "RPO:value" tag, wherein the value is based at least in part on one or more snapshot requirements, and then proceeding to step 206. If no (that is, none of the identified resources need to be monitored for snapshots), step 206 includes determining whether any of the identified resources need to be monitored for a space alert. If no (that is, none of the identified resources need to be monitored for a space alert), then the workflow ends at step 210. If yes (that is, at least one of the identified resources needs to be monitored for a space alert), step 208 includes tagging the given resource(s) with a "SpaceAlert:value" tag, wherein the value is based at least in part on one or more space alert requirements, and then ending the workflow at step 210.

Figure 3:
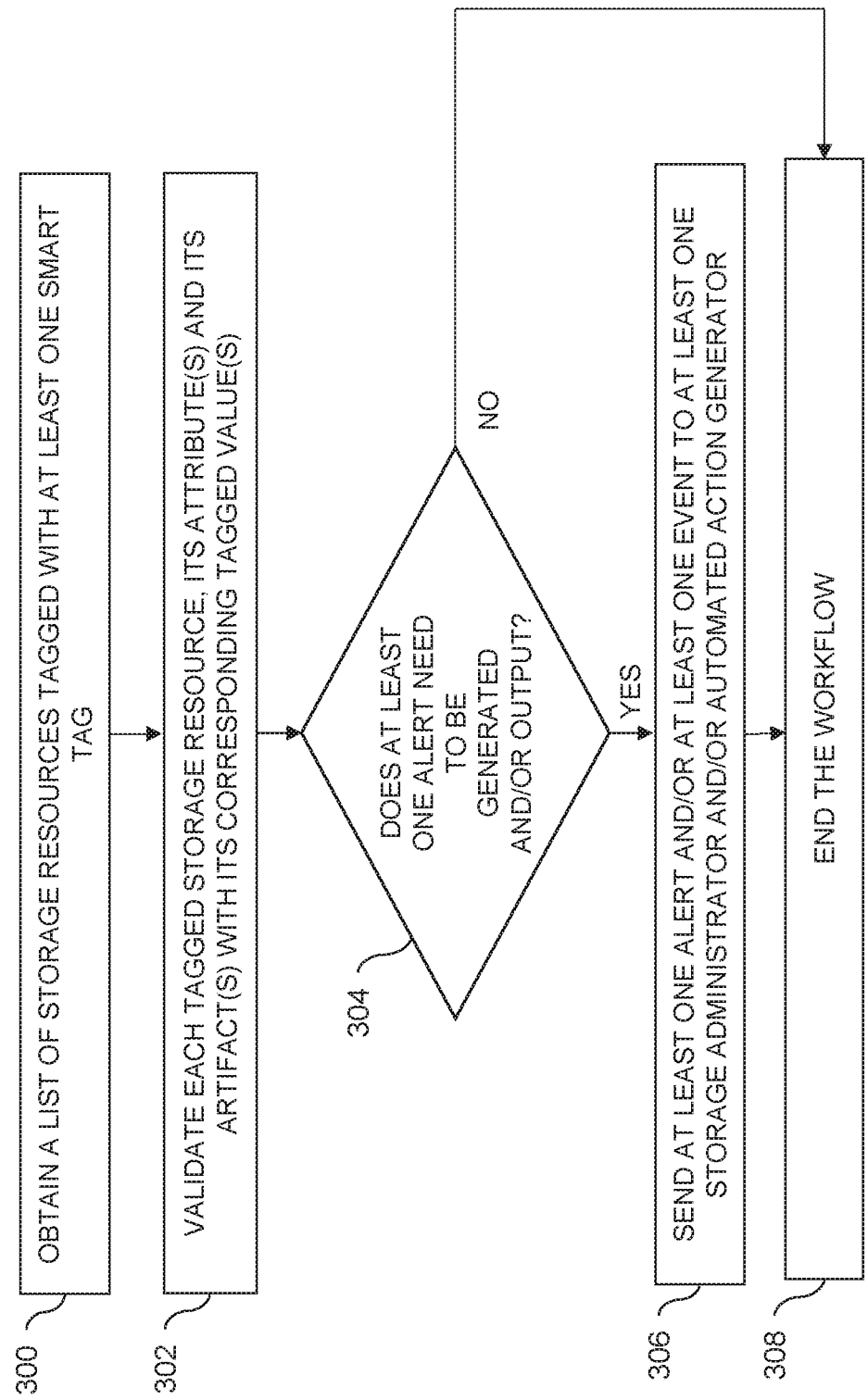
FIG. 3 shows an example workflow of actions carried out by at least one storage tag manager in an illustrative embodiment.

FIG. 3 shows an example workflow of actions carried out by at least one storage tag manager in an illustrative embodiment. As used herein, a storage tag manager refers to software that can, for example, be bundled with an enterprise storage array and carry out one or more automated actions. Additionally, in one or more embodiments, tasks of a storage tag manager include identifying storage resources and corresponding tag value(s) of the storage resources, and validating attributes and artifacts of the storage resource(s) with the tagged value(s). Attributes of storage resources can include, for example, size of the resource(s), already-used capacity, remaining free tracks of the storage resource(s), creation date and time, world wide name (WWN) of a volume, the number of snapshots, snapshot creation details, etc. Artifacts of storage resources can include, for example, related resources attached to the storage resource(s) such as a list of snapshots of one or more volumes, attached host(s) of the storage resource(s), storage pool(s) of the volume(s), etc. Additionally, and as detailed herein, a storage tag manager can include an automated scheduler which runs per a predetermined schedule (e.g., every three minutes, every sixty minutes, etc.) to monitor particular storage resources.

Referring back to FIG. 3, step 300 includes obtaining a list of storage resources tagged with at least one smart tag such as, for example, "RPO," "SpaceAlert," etc. At least one embodiment also includes, for example, monitoring the storage resource snapshots with the smart tag "RPO:value," and monitoring the storage resources space(s) with the smart tag "SpaceAlert:value." Referring again to FIG. 3, step 302 includes validating each such tagged storage resource, its attribute(s) and its artifact(s) with the corresponding tagged value(s). Also, step 304 includes determining if, based at least in part on the validation(s), at least one alert needs to be generated and/or output (e.g., to a storage administrator and/or automated action generator). If no (that is, no alert needs to be generated and/or output), then the workflow ends at step 308. If yes (that is, at least one alert needs to be generated and/or output), step 306 includes generating and/or outputting at least one alert and/or at least one event to at least one storage administrator and/or an automated action generator, and then ending the workflow at step 308.

In connection with the techniques detailed in connection with FIG. 2 and FIG. 3, in at least one embodiment, a smart tag generator can generate and implement multiple smart tags, such as an RPO tag and a SpaceAlert tag. With respect to an RPO (notification type: event), to notify an RPO issue, an event would be generated. Events, as used herein are notification mechanisms in an array. Once an event is generated, it would be listed in an event screen in an array user interface, and storage administrators can see the events in the events screen.

With respect to a SpaceAlert (notification type: alert), to notify a SpaceAlert issue, an alert would be generated. As used in this context, an alert is similar to an event, but represents a more critical notification. Once an alert is generated, it would be listed in an alerts screen in the user interface and a notification would be output to the storage administrator(s).

By way merely of illustration, consider the following example use case, which details the state of storage volume (storage resource) 00AAA in an enterprise array, starting September 10th, 11:15 AM. Attributes of storage volume 00AAA can include, for example:
  Size: 10 terabytes (TB);
  Used Capacity: 8 TB;
  Remaining Capacity: 2 TB
  Creation Date: September 1st;
  WWN: xxxxxx70878111666675433030313536;
  Number of Snapshots: 10;
  Created By: User1;
  Name: 00AAA.

Also, in such an illustrative example, at least one tag being utilized can include the following: RPO:30 minutes (min), SpaceAlert:90, "oracleDB1," "hostone," and "testdb." Additionally, artifacts of storage volume 00AAA can include, for example:
  List of snapshots: Snapshot1 (Each snapshot would have its own attributes such as, for example, Creation Date/Time: September 10th, 10:00 AM; Source Volume: 00AAA; Name: Snapshot1; and Created By: Replication Product1); Snapshot2 (Creation Date/Time: September 10th, 10:30 AM; Source Volume: 00AAA; Name: Snapshot2; and Created By: Replication Product2); and Snapshot3 (Creation Date/Time: September 10th, 11:00 AM; Source Volume: 00AAA; Name: Snapshot3; Created By: Replication Product1); and
  List of attached hosts: Host1 (Attributes can include, for example, IP Address: 10.xxx.90.90; Type: Windows; and Name: host1); and Host2 (IP Address: 10.xxx.90.91; Type: Windows; and Name: host2). n an example embodiment in connection with such an illustrative use case, a storage tag manager can be configured to run at a frequency configured by a storage administrator (e.g., every thirty minutes, every hour, every three hours, etc.).

Continuing with the example use case, assume that at 11:45 AM, storage volume 00AAA used capacity reached 9.2 TB and remaining capacity decreased to 0.8 TB. At 12:00 PM, based on a configuration such as detailed above, the storage tag manager starts to validate the tags with attributes and artifacts. The storage tag manager obtains and/or identifies all of the tags, attributes and artifacts of the storage volume 00AAA.

Referring again to the smart tags included in this example use case, a first such tag, RPO:30 min, mandates that the storage volume 00AAA should have snapshots of the volume created every 30 minutes. Accordingly, in at least one example embodiment, the tag manager reads all of the snapshots of 00AAA and validates that 00AAA has snapshots created once every 30 minutes (e.g., for a given temporal period). If 00AAA has snapshots for every 30 minute interval, no event would be generated. Otherwise, an event would be generated in the storage array. For example, assume that 00AAA's last created snapshot is from 11:00 AM, and no other snapshot has been created until 12:00 PM. As such, this violates the RPO smart tag condition, and an event would be generated.

Another smart tag in this example use case, SpaceAlert: 90, indicates that an alert needs to be generated in instances wherein space capacity for 00AAA reaches above 90%. Accordingly, in an example embodiment, the tag manager reads all of the attributes of 00AA at 12:00 PM and automatically determines that 00AAA violates the SpaceAlert smart tag value as 00AAA's capacity is 92% used. Consequently, an alert would be generated and would be sent to at least one storage administrator and/or automated action generator.

Figure 4:
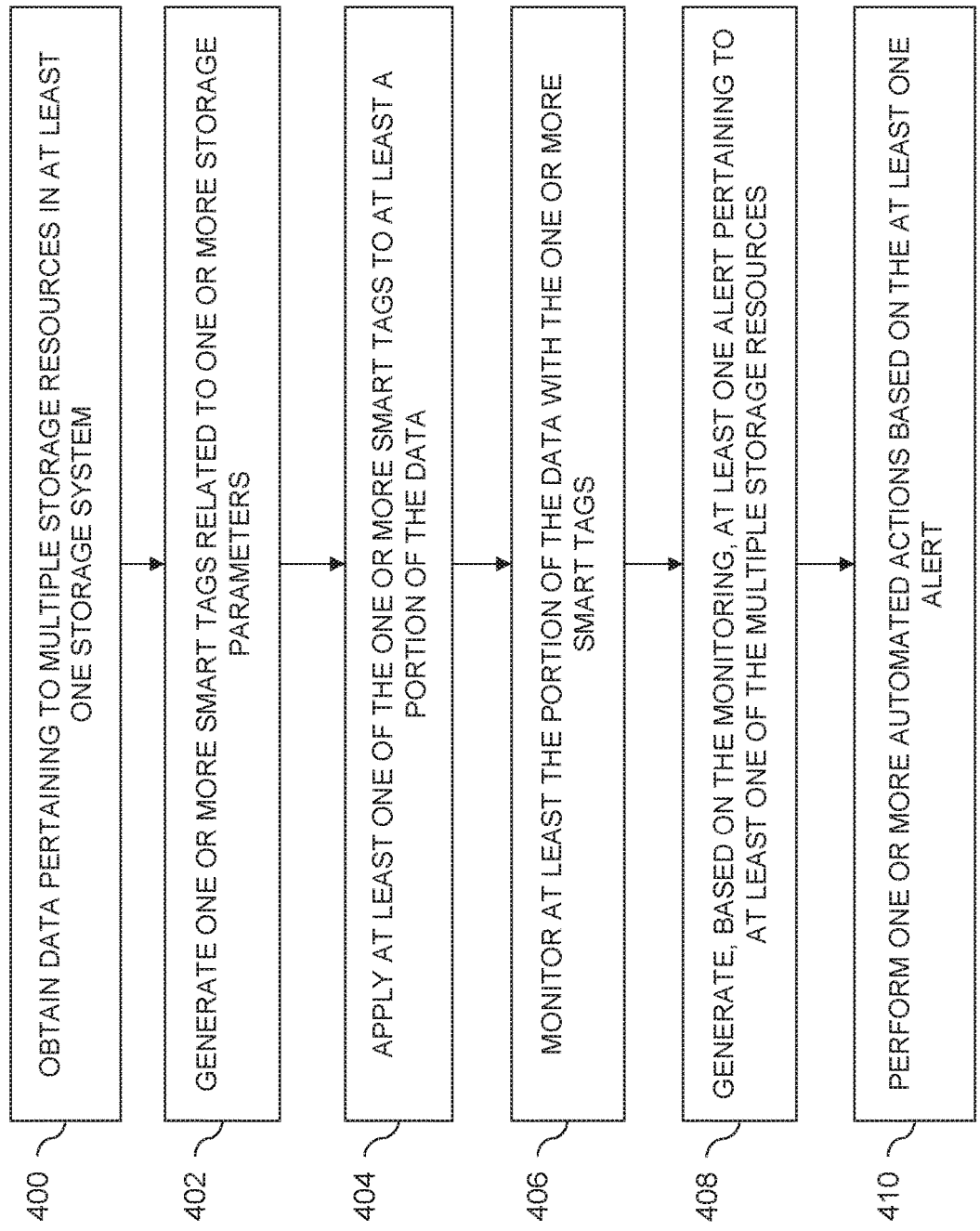
FIG. 4 is a flow diagram of a process for monitoring and processing storage resource data using smart tagging techniques in an illustrative embodiment.

FIG. 4 is a flow diagram of a process for monitoring and processing storage resource data using smart tagging techniques in an illustrative embodiment. It is to be understood that this particular process is only an example, and additional or alternative processes can be carried out in other embodiments.

In this embodiment, the process includes steps 400 through 410. These steps are assumed to be performed by the storage resource data processing system 105 utilizing its modules 112, 114 and 116.

Step 400 includes obtaining data pertaining to multiple storage resources in at least one storage system. Step 402 includes generating one or more smart tags related to one or more storage parameters. In at least one embodiment, the one or more smart tags include at least one smart tag related to recovery point objective. In such an embodiment, the at least one smart tag related to recovery point objective includes a value that is based at least in part on one or more snapshot requirements. Additionally or alternatively, in at least one embodiment, the one or more smart tags include at least one smart tag related to storage capacity. In such an embodiment, the at least one smart tag related to storage capacity includes a value that is based at least in part on one or more capacity alert requirements.

Step 404 includes applying at least one of the one or more smart tags to at least a portion of the data. In at least one embodiment, applying the at least one of the one or more smart tags to at least a portion of the data includes applying the at least one of the one or more smart tags to a portion of the data designated by at least one storage administrator.

Step 406 includes monitoring at least the portion of the data with the one or more smart tags. In one or more embodiments, monitoring includes validating at least the portion of the data with the one or more smart tags against at least one value associated with the one or more smart tags. Step 408 includes generating, based at least in part on the monitoring, at least one alert pertaining to at least one of the multiple storage resources.

Step 410 includes performing one or more automated actions based at least in part on the at least one alert. In at least one embodiment, performing one or more automated actions includes automatically creating at least one snapshot for at least one of the multiple storage resources. Additionally or alternatively, in at least one embodiment, performing one or more automated actions includes automatically expanding capacity of at least one of the multiple storage resources. Further, in one or more embodiments, performing one or more automated actions can include automatically outputting the at least one alert to one or more storage administrators.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and utilize smart tags to perform automated actions with respect to storage resource alerts. These and other embodiments can effectively overcome problems associated with error-prone manual generation of copy creation schedules and resource monitoring.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
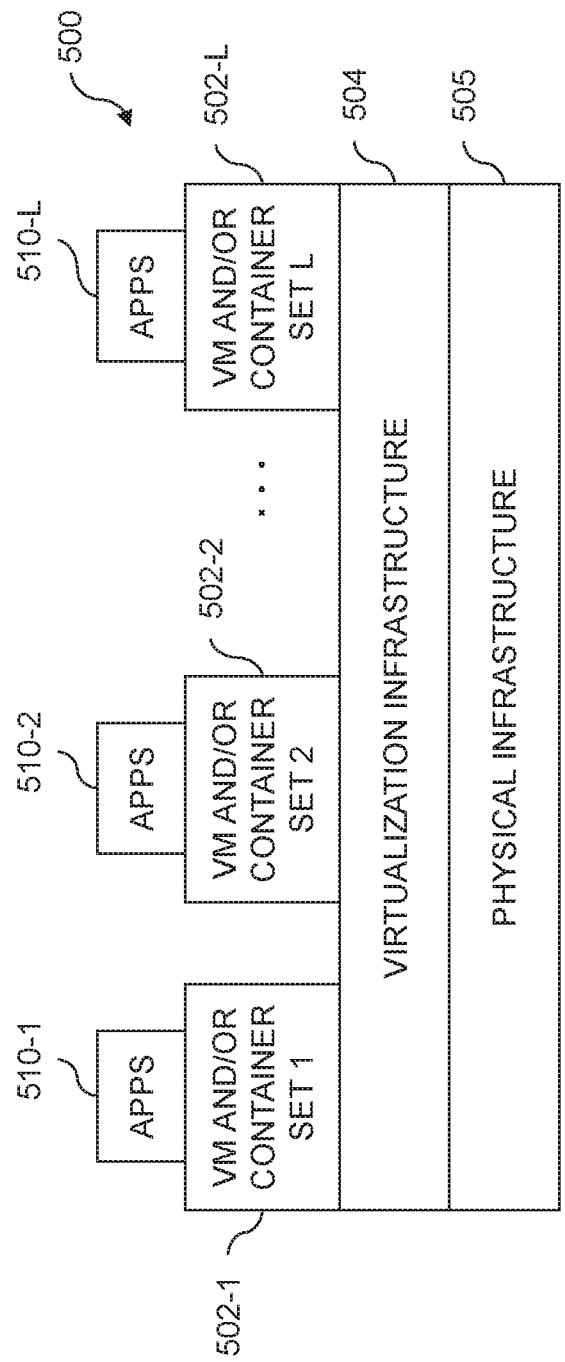
FIGS. 5 and 6 show examples of processing platforms that may be utilized to implement at least a portion of an information processing system in illustrative embodiments.
Figure 6:
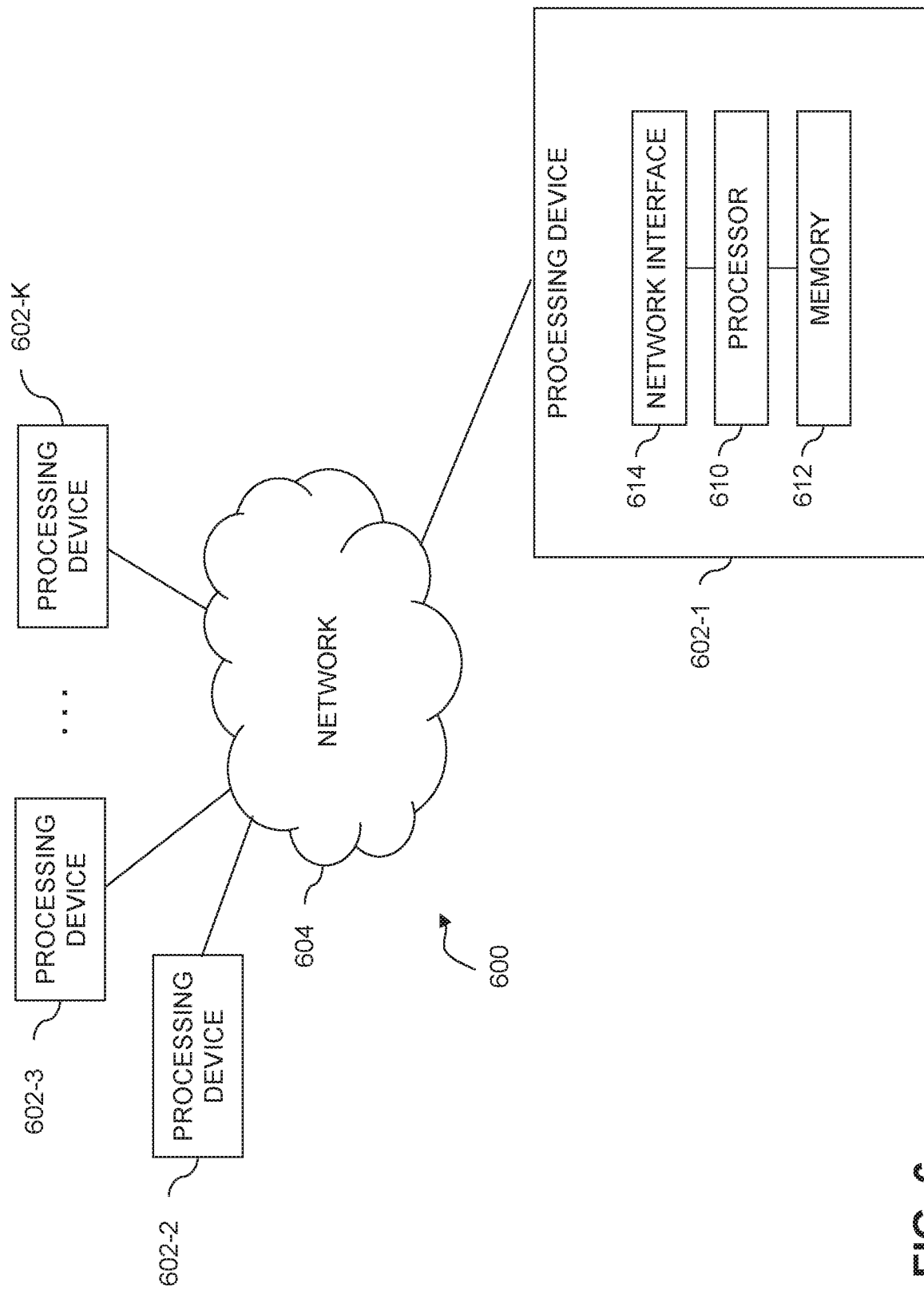

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments, different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining data pertaining to multiple storage resources in at least one storage system;
generating one or more smart tags related to one or more storage parameters, wherein the one or more smart tags comprises at least one smart tag related to recovery point objective, and wherein generating the at least one smart tag related to recovery point objective comprises attributing, to the at least one smart tag related to recovery point objective, a value designating a predetermined amount of time between creation of snapshots of at least a portion of the multiple storage resources;

applying at least one of the one or more smart tags to at least a portion of the data;
monitoring at least the portion of the data with the one or more smart tags;
generating, based at least in part on the monitoring, at least one alert pertaining to at least one of the multiple storage resources; and
performing one or more automated actions based at least in part on the at least one alert;
wherein the method is performed by at least one processing device comprising a processor coupled to a memory.

2. The computer-implemented method of claim 1, wherein the one or more smart tags comprises at least one smart tag related to storage capacity.

3. The computer-implemented method of claim 2, wherein the at least one smart tag related to storage capacity comprises a value that is based at least in part on one or more capacity alert requirements.

4. The computer-implemented method of claim 1, wherein performing one or more automated actions comprises automatically creating at least one snapshot for at least one of the multiple storage resources.

5. The computer-implemented method of claim 1, wherein performing one or more automated actions comprises automatically expanding capacity of at least one of the multiple storage resources.

6. The computer-implemented method of claim 1, wherein monitoring comprises validating at least the portion of the data with the one or more smart tags against at least one value associated with the one or more smart tags.

7. The computer-implemented method of claim 1, wherein applying the at least one of the one or more smart tags to at least a portion of the data comprises applying the at least one of the one or more smart tags to a portion of the data designated by at least one storage administrator.

8. The computer-implemented method of claim 1, wherein performing one or more automated actions comprises automatically outputting the at least one alert to one or more storage administrators.

9. A non-transitory processor-readable storage medium having stored therein program code of one or more software programs, wherein the program code when executed by at least one processing device causes the at least one processing device:
to obtain data pertaining to multiple storage resources in at least one storage system;
to generate one or more smart tags related to one or more storage parameters, wherein the one or more smart tags comprises at least one smart tag related to recovery point objective, and wherein generating the at least one smart tag related to recovery point objective comprises attributing, to the at least one smart tag related to recovery point objective, a value designating a predetermined amount of time between creation of snapshots of at least a portion of the multiple storage resources;
to apply at least one of the one or more smart tags to at least a portion of the data;
to monitor at least the portion of the data with the one or more smart tags;
to generate, based at least in part on the monitoring, at least one alert pertaining to at least one of the multiple storage resources; and
to perform one or more automated actions based at least in part on the at least one alert.

10. The non-transitory processor-readable storage medium of claim 9, wherein the one or more smart tags comprises at least one smart tag related to storage capacity, wherein the at least one smart tag related to storage capacity comprises a value that is based at least in part on one or more capacity alert requirements.

11. The non-transitory processor-readable storage medium of claim 9, wherein performing one or more automated actions comprises automatically creating at least one snapshot for at least one of the multiple storage resources.

12. The non-transitory processor-readable storage medium of claim 9, wherein performing one or more automated actions comprises automatically expanding capacity of at least one of the multiple storage resources.

13. The non-transitory processor-readable storage medium of claim 9, wherein monitoring comprises validating at least the portion of the data with the one or more smart tags against at least one value associated with the one or more smart tags.

14. The non-transitory processor-readable storage medium of claim 9, wherein applying the at least one of the one or more smart tags to at least a portion of the data comprises applying the at least one of the one or more smart tags to a portion of the data designated by at least one storage administrator.

15. An apparatus comprising:
at least one processing device comprising a processor coupled to a memory;
the at least one processing device being configured:
to obtain data pertaining to multiple storage resources in at least one storage system;
to generate one or more smart tags related to one or more storage parameters, wherein the one or more smart tags comprises at least one smart tag related to recovery point objective, and wherein generating the at least one smart tag related to recovery point objective comprises attributing, to the at least one smart tag related to recovery point objective, a value designating a predetermined amount of time between creation of snapshots of at least a portion of the multiple storage resources;
to apply at least one of the one or more smart tags to at least a portion of the data;
to monitor at least the portion of the data with the one or more smart tags;
to generate, based at least in part on the monitoring, at least one alert pertaining to at least one of the multiple storage resources; and
to perform one or more automated actions based at least in part on the at least one alert.

16. The apparatus of claim 15, wherein the one or more smart tags comprises at least one smart tag related to storage capacity, wherein the at least one smart tag related to storage capacity comprises a value that is based at least in part on one or more capacity alert requirements.

17. The apparatus of claim 15, wherein performing one or more automated actions comprises automatically creating at least one snapshot for at least one of the multiple storage resources.

18. The apparatus of claim 15, wherein performing one or more automated actions comprises automatically expanding capacity of at least one of the multiple storage resources.

19. The apparatus of claim 15, wherein monitoring comprises validating at least the portion of the data with the one or more smart tags against at least one value associated with the one or more smart tags.

20. The apparatus of claim 15, wherein applying the at least one of the one or more smart tags to at least a portion of the data comprises applying the at least one of the one or more smart tags to a portion of the data designated by at least one storage administrator.

\* \* \* \* \*